No. 608,156. Patented July 26, 1898.
H. PAAR.
HORSESHOE.
(Application filed Nov. 27, 1897.)
(No Model.)
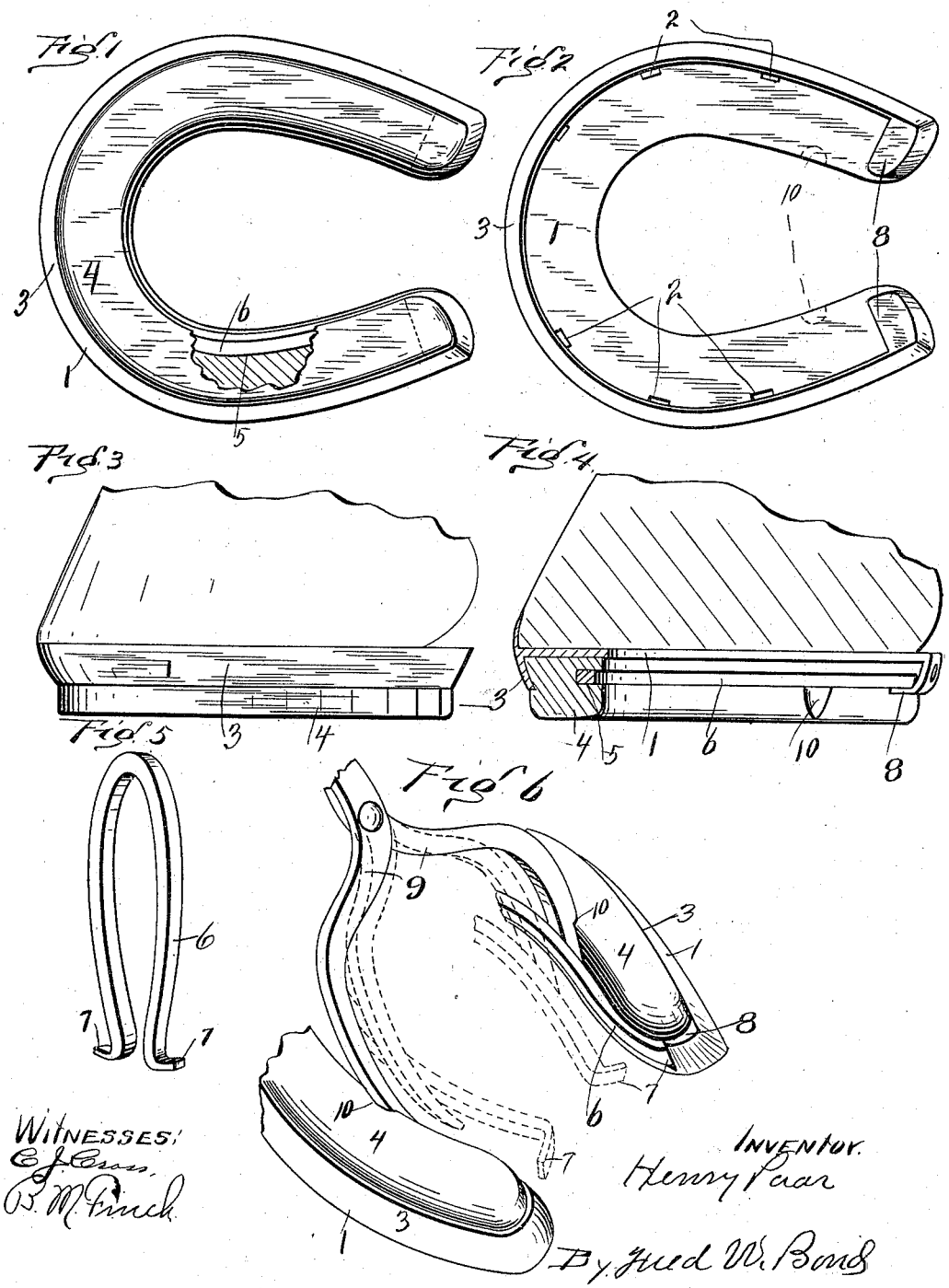
Inventor.
Henry Paar

UNITED STATES PATENT OFFICE.

HENRY PAAR, OF CANTON, OHIO, ASSIGNOR OF ONE-HALF TO LOUIS D. PAAR, OF SAME PLACE.

HORSESHOE.

SPECIFICATION forming part of Letters Patent No. 608,156, dated July 26, 1898.

Application filed November 27, 1897. Serial No. 660,011. (No model.)

*To all whom it may concern:*

Be it known that I, HENRY PAAR, a citizen of the United States, residing at Canton, in the county of Stark and State of Ohio, have invented certain new and useful Improvements in Horseshoes; and I do hereby declare that the following is a full, clear, and exact description of the same, reference being had to the annexed drawings, making a part of this specification, and to the figures of reference marked thereon, in which—

Figure 1 is a bottom or under side view of the shoe. Fig. 2 is a similar view showing the tread removed. Fig. 3 is a side view showing the shoe properly attached. Fig. 4 is a transverse section showing the shoe connected to the hoof. Fig. 5 is a detached view of the spring retaining-bar. Fig. 6 is a view showing manner of removing the spring retaining-bar to detach the tread.

The present invention has relation to horseshoes; and it consists in the novel arrangement hereinafter described, and particularly pointed out in the claims.

Similar numbers of reference indicate corresponding parts in all the figures of the drawings.

In the accompanying drawings, 1 represents the body of the shoe, which is formed in the usual manner as to shape and size and is constructed with reference to the manner of attaching and holding the tread hereinafter described.

The body 1 is provided with the nail-apertures 2, which nail-apertures are located and arranged in the usual manner. The body 1 is provided with the downwardly-projecting flange 3, which flange is for the purpose of assisting in holding the tread 4, which tread is formed of rubber or like material and is for the purpose of producing a cushioned shoe.

The tread 4 is provided with the groove 5, which groove is located upon the inner portion of the tread and is for the purpose of receiving the spring retaining-bar 6. The spring retaining-bar is formed of spring metal of a high tension and is so adjusted or tempered that its normal position will be that illustrated in Figs. 1 and 6, and when in its normal position and placed in proper relation to the tread 4 its outer edge will be firmly seated against the bottom or seat of the groove 5, as illustrated in Fig. 4, thereby securely holding the tread in proper position, which is accomplished by the pressure exercised by the retaining-bar, thereby forcing the tread snugly against the flange 3.

For the purpose of holding the heel ends of the retaining-bar 6 said retaining-bar is provided with the lateral lugs 7, which lateral lugs come over the flanges 8, which flanges are formed upon the heel ends of the body 1. For the purpose of providing a means for quickly and easily removing the spring retaining-bar 6 tongs, such as 9, are provided, and for the purpose of entering the members of the tongs 9 back or behind the spring retaining-bar 6 the tread 4 is provided with the cut-out portions 10, so as to provide room for entering the tongs. After the tongs have been properly entered, as illustrated in Fig. 6, the entered ends of the tongs are brought toward each other in the same manner that a pair of tongs are closed, by which arrangement the spring retaining-bar 6 is sprung away from the tread and out of the groove in such a manner that it is free to be removed, thereby providing a means for easily removing the tread.

In order to replace a tread that has become worn, a new tread is placed in proper position, the retaining-bar being gripped between the members of the tongs is compressed and the toe end of the retaining-bar seated into the groove at the toe end or portion of the tread, after which the spring retaining-bar is free to assume its normal position and retain the tread in its proper relative position.

Having fully described my invention, what I claim as new, and desire to secure by Letters Patent, is—

1. The combination of the body 1, provided with nail-apertures and the flange 3, the tread 4, provided with the groove 5, the spring retaining-bar 6, normally located in the groove and provided with the lateral lugs 7, and the flanges 8, formed upon the heel ends of the body 1, substantially as and for the purpose specified.

2. The combination of the body 1, provided with a flange and nail-apertures, the tread 4, provided with a groove upon its inner portion, cut-out portions 10, formed in the tread, a spring retaining-bar normally located in the groove, of the tread, and lateral lugs located at the heel ends of the spring retaining-bar, and flanges 8, formed upon the body 1, substantially as and for the purpose specified.

In testimony that I claim the above I have hereunto subscribed my name in the presence of two witnesses.

HENRY PAAR.

Witnesses:
F. W. BOND,
L. D. PAAR.